United States Patent [19]
Bauer

[11] 3,883,171
[45] May 13, 1975

[54] CRUSH RESISTANT COMPARTMENT FOR VEHICLES

[75] Inventor: Andreas Bauer, Fallersleben, Germany

[73] Assignee: Volkswagenwerk Aktiengesellschaft, Wolfsburg, Germany

[22] Filed: July 20, 1973

[21] Appl. No.: 381,082

[30] Foreign Application Priority Data
July 31, 1972 Germany............................ 2237532

[52] U.S. Cl.............................. 296/28 R; 296/146
[51] Int. Cl............................................. B62d 25/00
[58] Field of Search................... 296/28 R, 146, 1 R

[56] References Cited
UNITED STATES PATENTS
1,826,440  10/1931  Tarbox............................. 296/146
3,363,934  1/1968  Peters.............................. 296/28 R
3,718,364  2/1973  Fischer et al..................... 296/28 R FOREIGN PATENTS OR APPLICATIONS
1,806,716  6/1970  Germany.......................... 296/28 R Primary Examiner—Robert B. Reeves
Assistant Examiner—Francis J. Bartuska
Attorney, Agent, or Firm—Brumbaugh, Graves, Donohue & Raymond

[57] ABSTRACT

This disclosure concerns a crush resistant structure for a vehicle door opening at least partially defined by a fixed support member along a boundary. A movable closure (door) is provided for opening and closing the opening. At least one impact resistant element may be formed as part of the closure and extends transversely across the opening. The impact resistant element is provided with a pair of substantially mutually perpendicular interior bearing surfaces adapted when the opening is closed, for proximate juxtaposition with respect to corresponding exterior surfaces on the fixed support. In some vehicles, the fixed support divides the opening thereby necessitating a pair of closures. Each closure may be provided with a similar impact resistant element. When the openings are closed, the bearing surfaces of the impact resistant elements lie closely adjacent to and substantially surround the fixed support on three sides. In some instances, the compartment may be provided with a pair of fixed supports aligned on parallel side walls. In these circumstances, each fixed support may be provided with an integral substantially perpendicular extension which forms part of an adjacent wall of the compartment. These extensions may be joined together substantially at the center of the compartment to form a continuous supportive cross beam between the supports.

10 Claims, 3 Drawing Figures

CRUSH RESISTANT COMPARTMENT FOR VEHICLES

BACKGROUND OF THE INVENTION

The invention relates to an impact resistant structure for reinforcing the walls of a compartment, and more particularly to an impact resistant structure for a motor vehicle passenger compartment having cooperating fixed and movable supports adapted to fit together effectively to resist lateral and longitudinal impact forces which may be applied to the vehicle in the event of an accident.

One of the most important areas of concern with respect to transportation relates to vehicle safety. In particular, the automotive industry has long been attempting to develop ways and means of protecting the passenger compartments of motor vehicles against crushing forces which develop in many automobile accidents, and which seriously threaten the safety of passengers.

This problem is particularly acute with respect to side or lateral impacts on motor vehicles where it is difficult to employ the popular concept of a crushing zone having sufficient deformation length to absorb impact forces during an accident.

SUMMARY OF THE INVENTION

It is one object of the present invention to provide an impact resistant structure for a compartment in which lateral and longitudinal impact forces are effectively absorbed without crushing the compartment.

Another object of the present invention is to provide an impact resistant structure adapted for reinforcing an automobile passenger compartment which minimizes the danger of passenger injury due to collision impact penetration of the passenger compartment.

Still another object of the present invention is to provide an impact resistant structure for reinforcing the doors of an automobile effectively resist lateral and longitudinal impact forces on the vehicle A further object of the present invention is to provide an impact resistant structure for reinforcing the doors of an automobile which cooperates with fixed carriage frame supports to resist lateral and longitudinal impact forces on the vehicle.

The present invention achieves these and other objects by providing a simple and inexpensive impact resistant structure which is adapted in its preferred form for use in automobiles, trucks, trains and the like, and which effectively resists both lateral and longitudinal impact forces which may be applied to the vehicle in a collision accident.

In the preferred embodiment, the invention generally provides for an impact resistant element or beam which is provided as part of each vehicle door and which cooperates with fixed carriage supports when the vehicle door is closed to resist both lateral and longitudinal impact forces.

In particular, each door beam is provided at one end with a pair of adjoining substantially mutually perpendicular interior bearing surfaces. One of the surfaces, the lateral bearing surface, preferably extends along the longitudinal axis of the beam, while the other, the longitudinal bearing surface, extends inwardly from the first surface in a direction substantially transverse to the longitudinal axis of the beam.

The fixed carriage supports are provided with corresponding pairs of exterior bearing surfaces. When the vehicle door is closed, the respective pairs of bearing surfaces on the beam and carriage supports lie in closely adjacent positions. In the event of application of a lateral impact force against the vehicle, the adjacent lateral bearing surfaces of the door and frame are urged together to resist crushing of the passenger compartment, while the cooperating pair of longitudinal bearing surfaces are adapted for engagement in the event of application of a longitudinal impact force against the vehicle.

In this way, the vehicle doors may be reinforced with sufficient rigidity to resist serious reduction of the volume of the passenger compartment in the event of an impact.

For those vehicles having two doors side by side, the present invention provides for each of the doors to have a corresponding impact resistant beam of the type described above. In this circumstance, the vehicle generally is provided with a fixed frame member which separates the entrances into the passenger compartment. Thus, the bearing surfaces of the impact resistant beams of the doors of the vehicle substantially surround the fixed frame on three sides when the doors of the vehicle are closed.

In this embodiment, the end portions of each of the door beams adjacent the lateral bearing surfaces are adapted for closely adjacent alignment when the doors of the vehicle are closed. This arrangement provides a further abutment interface to resist longitudinal impacts on the vehicle.

It is important to note that additional lateral impact support may be provided for the automobile where parallel sidewalls of the vehicle compartment include laterally aligned fixed carriage supports. In this instance, each of the supports may be provided with an integral laterally extending protrusion forming part of a mutually adjacent wall of the compartment. The extensions may be joined together substantially at the center of the vehicle to form a continuous cross beam support between the supports.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
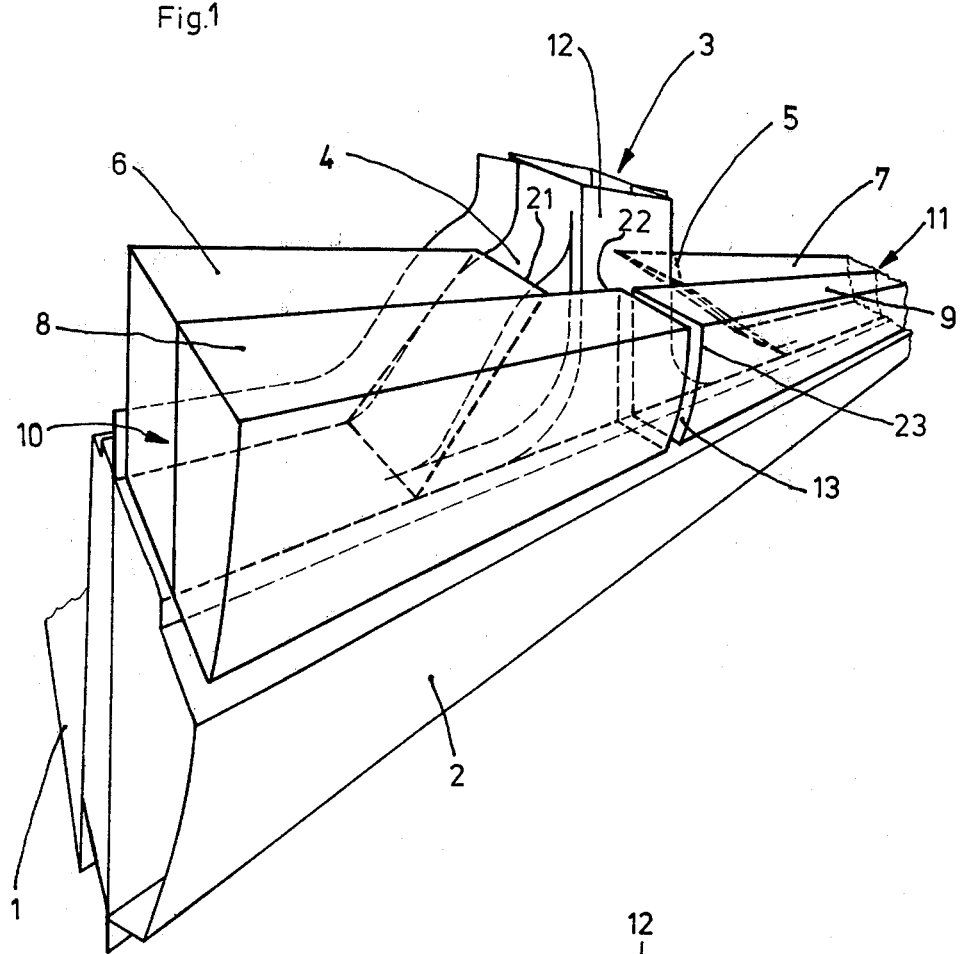
FIG. 1 is a perspective view of a portion of an automobile showing the structural reinforcements of the present invention.

Referring now to the drawing, and in particular to FIG. 1, there is illustrated a preferred embodiment of the present invention including a portion of the frame section for an automobile having a floor plate 1 which is connected to a lower side girder 2 of the vehicle frame which extends substantially horizontally along the length of the automobile. Integral with and extending substantially vertically upwardly from the lower side girder 2, is a fixed primary support member of column 3 which, the usual circumstance, effectively divides the entrance to the passenger compartment of the vehicle. The column 3, for example, would separate the front seat passenger entrance from the rear seat passenger entrance.

Generally, the support column 3 is provided with sloping side surfaces 4 and 5 adapted to strengthen the column structure, and may be utilized, in accordance with the present invention, as bearing abutment surfaces.

It should be understood that the impact resistant structure of the present invention is described herein, by way of example only, in connection with reinforcing automobile passenger compartments. In general, the invention is intended for use with any type of compartment having at least one opening and a closure movable to open and close the opening.

For example, the invention, as described herein, may also find utility in connection with other types of vehicles such as trains, in which the doors may not only pivot into and out of closed position, but may also be movable back and forth longitudinally across the opening or entrance to the passenger compartment.

Figure 3:
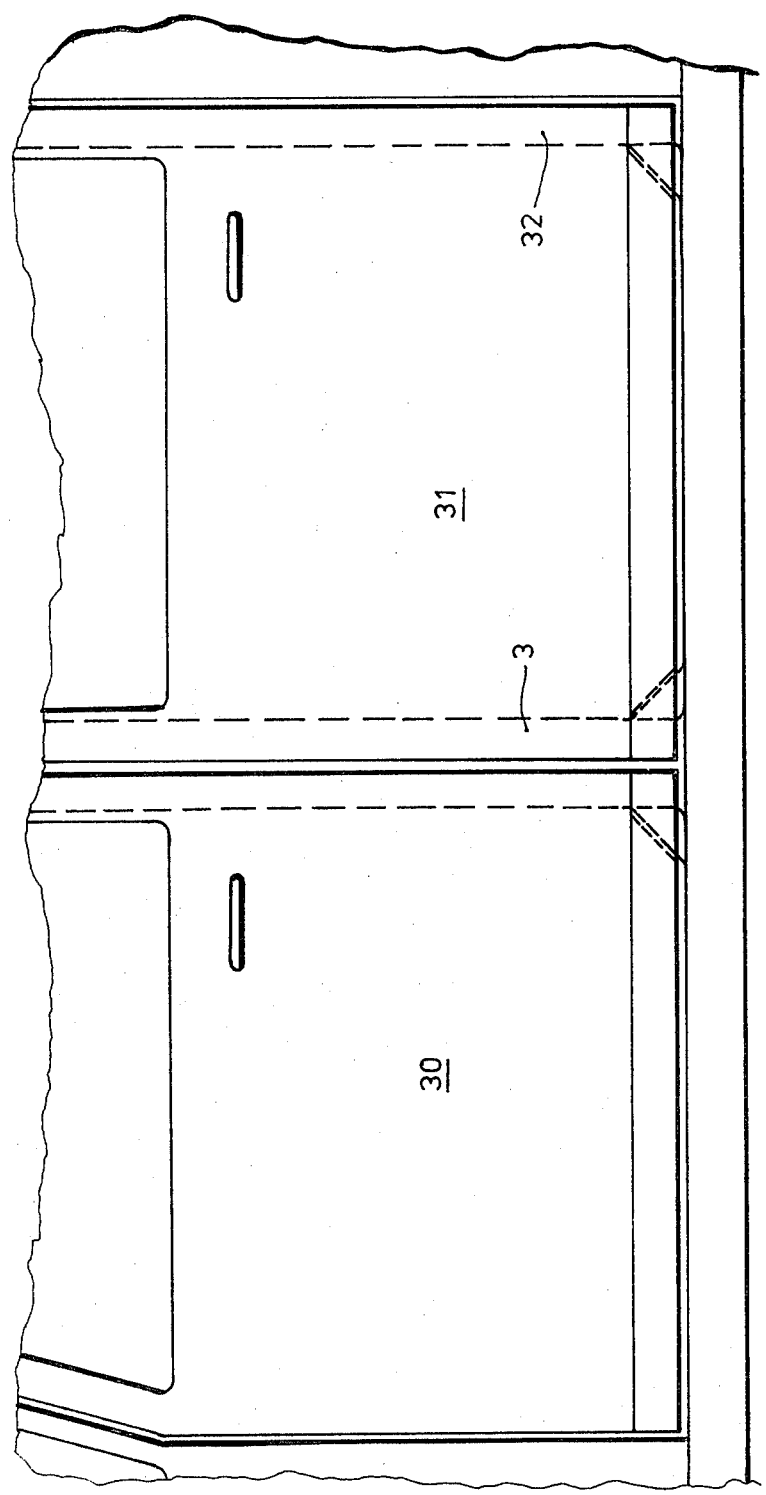
FIG. 3 is a partial side view of a two door vehicle showing the framework columns flanking the door opening.

In accordance with the invention, each vehicle door, for example the door 30 (FIG. 3), is provided with a reinforcing impact resistant element or beam, such as the beam 10. A similar beam 11 is also depicted in FIG. 1 as part of an adjacent door structure 31 (FIG. 3). Each of the beams 10 and 11 preferably extends substantially transversely across the respective vehicle entrance from one fixed column, such as the fixed column 3, to another similar column or frame member 32 (FIG. 3) formed as part of the vehicle carriage frame. In the preferred embodiment the end portions of each of the beams 10 and 11 adjacent the column 3 are provided with a pair of adjoining substantially mutually perpendicular bearing surfaces 21 and 22 inwardly located between the outer and inwardly facing longitudinal surfaces of the beams as shown in FIG. 1. Depending upon the configuration of the exterior surface area of the column 3, the bearing surfaces 21 and 22 are preferably substantially flat. One of the surfaces, for example that indicated by reference numeral 22, lies substantially along the longitudinal axis of the beam 10, while the other surface, namely surface 21, lies in a direction substantially transverse to the longitudinal axis of the beam.

The beams 10 and 11 may be considered as consisting of a pair of adjacent regions or zones 6 and 8, the former of which is shorter than the latter and lies substantially between fixed columns when the door is closed. The region 8 of the beam 10 essentially flanks the vehicle opening and extends in a substantially horizontal direction to overlap a portion of the exterior surface area of the fixed columns, such as the area indicated by reference numeral 12 of the fixed column 3. This provides a projecting outer portion of the beam 10, as depicted, adjacent the beam's outer surface, the outer portion defining the inwardly facing bearing surface 22 overlapping the column 3.

In this arrangement, the lateral bearing surface 22 formed as part of the outer region 8 of the beam 10, overlaps in a closely adjacent or juxtaposed position, the exterior surface area 12 of the column 3. As used herein, exterior or outer surface refers to the surface on a member facing away from the interior of the vehicle. Likewise, inward or inwardly facing refers to surfaces that face the vehicle interior. At the same time, the longitudinal bearing surface 21 of the beam 10 overlaps the interior surface area 4 of the column 3 in a similar way. Between them, the surfaces 21 and 22 define a recess that receives the column 3, as shown.

In this position, a lateral impact force applied against the door in a direction substantially perpendicular to the opening is substantially absorbed by the beam 10 and the column 3. Such an impact force will cause the bearing surfaces 22 and 12 of the beam and column respectively to abut together which abutment means that a component of the impact force is transmitted to and resisted by the column 3 as well as the beam, thereby minimizing its effect on the volume of the passenger compartment.

In a similar way, an impact force which is applied to the vehicle in a direction substantially longitudinally of the beam 10, as would occur as a result of a front or rear collision, will be absorbed by cooperation between the beam 10 and the column 3. Such a force will have a tendency to drive the bearing surface 21 of the beam 10 into engagement with the corresponding bearing surface 4 of the column 3. Where doors on either side of the passenger compartment of the vehicle are provided with beams of the aforesaid type, significant support is available to resist the otherwise crushing forces that can develop in a front or rear collision.

In the embodiment illustrated in FIG. 1, where the which is of the type having two doors side by side, the beams 10 and 11 may also be provided at each adjacent end of the outer region 8 with an additional bearing surface 23. The surfaces 23 also lie in a closely adjacent or juxtaposed position across a gap 13 and are adapted to abut together, if necessary, in the event of longitudinally applied impact forces. Such forces are thus additionally resisted by abutment directly between adjacent beams 10 and 11. This additional support is particularly significant in severe front or rear collisions.

Figure 2:
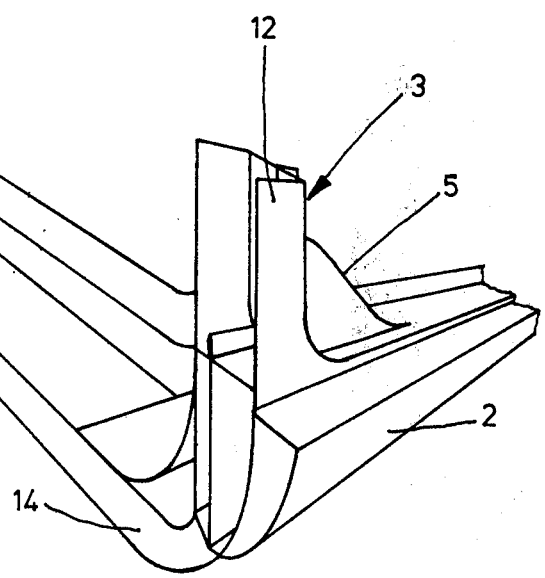
FIG. 2 is a perspective view of a portion of an alternate embodiment of the present invention.

Referring now to FIG. 2, there is depicted an alternate embodiment involving construction of the fixed frame or carriage members such as the column 3. In this embodiment, the substantially vertical column 3 is provided with an integral substantially laterally protruding extension or brace 14 which is preferably formed as part of an adjacent wall portion of the compartment, such as the floor or roof of the vehicle.

Where the overall frame structure of the vehicle permits, it has been found preferable to provide fixed frame columns such as the column 3, on parallel sidewalls of the passenger compartment. Each primary support, such as the column 3, will then have a complementary support located across the compartment on a parallel sidewall. Where such columns are laterally aligned, each may be provided with an integral brace such as the brace 14. In this event, the braces may extend toward each other in opposite directions to be joined together at the center of the mutually adjacent sidewall of the compartment thereby to form a continuous cross brace extending from one column to another. Under these circumstances, impact forces applied against the exterior surface 12 of the column 3, for example, in the direction of the brace 14, would be transmitted along the brace, and thereby shared with a corresponding vertical frame column (not shown) on the other side of the passenger compartment. This arrangement has been found to be effective in minimizing the deformation or crushing potential of a collision impact against the side of the vehicle.

Under some circumstances it may be desirable to provide each of the fixed supports, both primary and complementary, with a plurality of integral braces extending across and forming part of mutually adjacent sidewalls of the compartment. For example, the column 3 and its complement (not shown) may both be provided with a pair of braces, such as the brace 14, one extending across the floor of the vehicle and one extending across the roof. If these braces were joined, the result would be a continuous band of support completely surrounding the vehicle passenger compartment, and providing effective resistance to lateral collision forces or forces induced by a roll-over of the vehicle.

As indicated above, the foregoing description of the preferred embodiments of the present invention is exemplary only and modifications may be made without departing from the scope of the invention.

For example, the bearing surfaces 4, 12, 21, 22 and 23 may be oriented in any mutually cooperative abutment position which is effective to resist impact forces generally of the types referred to above. As depicted in FIG. 1, the bearing surfaces 12, 22 and 23 are substantially vertically arranged, while the bearing surfaces 4 and 21 are substantially obliquely oriented with respect to the horizontal plane. This arrangement has been found only to be a matter of convenience, owing to the sloping orientation of the lower ends of the column 3, and any effective modification may be made without departing from the scope of the invention.

What is claimed is:

1. A crush resistant compartment for a vehicle having an access opening flanked by a pair of fixed support columns extending between upper and lower walls of the compartment, and a movable closure member for opening and closing the opening, said compartment comprising:

a reinforcing impact resistant beam forming part of the closure member and extending transversely across the opening substantially between and adjacent each of the fixed columns when the opening is closed, said beam having a projecting outer portion adjacent its outer surface, said projecting outer portion defining an inwardly facing bearing surface overlapping one of said columns for abutting the column upon lateral impacting of the beam inwardly, said beam having a second bearing surface located between said projecting outer portion and an inner surface thereof and facing said one column within said opening when the opening is closed by said closure, the first bearing surface and the second bearing surface defining therebetween a recess receiving said one column.

2. The crush resistant compartment of claim 1 in which each of said first and second bearing surfaces respectively overlies an outwardly facing surface and an adjoining side surface of said one column.

3. The crush resistant compartment of claim 2 in which said reinforcing impact resistant beam is provided with a second projecting outer portion having a bearing surface overlapping an outwardly facing surface of the other of the columns flanking the opening and a further bearing surface facing an adjoining side surface of said other column.

4. The crush resistant compartment of claim 3 in which said adjoining side surfaces of each of said flanking columns face substantially in opposite directions across the opening.

5. The crush resistant compartment of claim 4, wherein said one column flanks a second access opening having a second movable closure, and said compartment comprises, in addition, a second reinforcing impact resistant beam forming part of the second movable closure and extending transversely across the second opening upon closing thereof, said second beam being substantially linearly aligned with said first beam when the access openings are simultaneously closed.

6. The crush resistant compartment of claim 5, wherein adjacent end portions of each of said impact resistant beams are provided with a substantially planar abutment surface formed on and terminating projecting outer portions of each of said beams, each of said abutment surfaces, facing the other when the access openings are closed.

7. The crush resistant compartment of claim 6, in which said second beam is provided with a further recess having first and second substantially planar bearing surfaces, the first bearing surface adapted to overlap said one column and the second bearing surface adapted to face said one column on a side opposite the second surface of said first beam, whereby said one column is substantially surrounded on three sides by bearing surfaces of said beams when the access openings are simultaneously closed.

8. The crush resistant compartment of claim 7, wherein said one column is provided with an integral substantially perpendicular extension protruding substantially transversely at least partly across one of the upper and lower walls of the compartment.

9. The crush resistant compartment of claim 8 comprising in addition a complementary column substantially diametrically across the compartment from and parallel to said one column, said complementary column having an integral substantially perpendicular extension protruding substantially transversely at least partly across said one of the upper and lower walls of the compartment.

10. The crush resistant compartment of claim 9, in which the distal end portions of said integral extensions are joined together to form a continuous cross beam.

* * * * *